FIG. I.

INVENTOR.
HOWARD ALAN THORPE
BY
Agent

Feb. 22, 1966  H. A. THORPE  3,237,151
UNDERWATER DETECTION BY INTERFACE COUPLING
Filed July 8, 1963  4 Sheets-Sheet 3

INVENTOR.
HOWARD ALAN THORPE
BY
*George C. Sullivan*
Agent

Feb. 22, 1966  H. A. THORPE  3,237,151
UNDERWATER DETECTION BY INTERFACE COUPLING
Filed July 8, 1963  4 Sheets-Sheet 4

INVENTOR.
HOWARD ALAN THORPE
BY
Agent

# United States Patent Office 3,237,151
Patented Feb. 22, 1966

3,237,151
UNDERWATER DETECTION BY INTERFACE COUPLING
Howard Alan Thorpe, Northridge, Calif., assignor to Lockheed Aircraft Corporation, Burbank, Calif.
Filed July 8, 1963, Ser. No. 293,409
14 Claims. (Cl. 340—3)

This invention relates to submarine detection and/or communication and more particularly to a novel method and apparatus therefor which may be used to transmit acoustic energy through an air-water interface in order to detect and locate the presence of a submarine or to communicate with a submarine by means of acoustical energy which is coupled into the water from an aircraft flying over the area of interest.

Various electro-acoustical devices have been proposed heretofore for the detection and location of submarines. There are two general types of sonar methods, active and passive. In an active sonar system a pulse of sound is generated by the searcher and projected into the water. This sound is reflected back from the target and detected by the searcher as an echo. Since the speed of sound in sea water is known, the range and also the bearing of the target may be obtained. This method is also called echo ranging. In a passive system the searcher detects the noises emitted by the target. Unless more than one listening station is involved, passive sonar provides information only as to the existence of a noise source and its bearings on the searcher. Active systems are used primarily by surface anti-submarine vessels, such as destroyers, since they generally operate in an environment which is too noisy for successful passive detection of a quiet submarine. This interfering noise may be generated by the anti-submarine vessel itself moving at high speed or by other ships in the vicinity which may be escorting. In order for active sonar devices to operate in the desired manner, it is necessary to generate substantial amounts of acoustic power from the submerged electro-acoustic transducer. This requirement generally dictates that the sonar apparatus be carried in a vehicle such as a submarine or a surface craft having a relatively large source of power. Such apparatus generally precludes the use of sonar in aircraft, although some attempts have been made to carry sonar apparatus aboard a helicopter having a trailing cable from which the transducer apparatus is suspended. This is sometimes referred to as "dipping sonar." The helicopter hovers at a relatively low altitude over the water trailing the cable so that the transducer apparatus is submerged in the water. This technique, while technically satisfactory, has rather severe logistical limitations due to the relatively limited range of helicopters which preclude their use at extended ranges from shore or from aircraft carrying ships.

In order to provide long range aircraft with submarine detection apparatus, sonobuoy devices have been proposed heretofore. These devices comprise detector instruments which are jettisoned from the aircraft in the region of interest and which, upon entering the water, are activated to float on the surface thereof and detect waterborne sounds and transmit them by a radio link to the aircraft. As generally used, these devices require that the submarine be in motion or otherwise generating sounds which may be detected. In this sense, they are passive devices since they rely on energy radiating from the submarine for detection. In order to overcome this limitation, it has been proposed heretofore to drop light explosive charges into the area of interest, together with the sonobuoys whereby bursts of acoustic energy are omnidirectionally propagated into the water and from which echos may be detected from reflecting surfaces of the submarine. This technique also suffers from certain severe logistical problems such as the hazards of transferring explosive charges, their relatively high cost, and the expendable nature of the sound generating charges. Also, from a technical standpoint, it is difficult to control the frequency spectrum of the propagated sounds in order to provide the desired acoustical characteristics.

Other types of devices have been proposed heretofore to permit long range aircraft to detect submarines, such as those which employ magnetic airborne detectors (MAD). The MAD is a magnetometer extended on a boom from an airplane, which detects the magnetic anomaly caused by the submarine. Since MAD has a low range, its primary usefulness is in the localization of a submarine.

The most urgent problem in anti-submarine warfare (ASW) in the foreseeable future is the detection of deep-running, quiet, nuclear submarines. Heretofore, the sonobuoy has been used extensively since it may be carried by long range aircraft. The advantage of sonobuoys in anti-submarine warfare are considerable for they allow high speed aircraft, which are relatively invulnerable to attack by submarine, to be used against submarines. If the submarine chooses to avoid detection by stopping or proceeding slowly, some time is allowed for the arrival of surface anti-submarine vessels, which can use active sonar detection methods.

Conventional sonobuoys are dropped or parachuted from low altitudes; after it contacts the water, a hydrophone is lowered and an antenna raised for radio transmission. The sonobuoy carries batteries which power a radio transmitter so that the sounds picked up by the hydrophone can be monitored by personnel in the aircraft. Since the sonobuoy detects the propeller or cavitation noises of the submarine, the range of detection depends upon the speed of the submarine and is relatively limited if the submarine is moving slowly. Since considerable energy is required to operate active sonar devices, it has generally not been feasible to obtain the benefit of active detection apparatus in a sonobuoy type of device.

By the present invention, there are provided novel and improved methods and apparatus therefor to overcome the disadvantages of the above-discussed prior submarine detection schemes by obtaining the advantages of active sonar devices yet which are useful with high-speed long range aircraft.

In order to overcome the shortcomings and deficiencies of the above discussed ASW devices, the present invention utilizes acoustic energy generated by an overflying aircraft as the source of projected sound in an active sonar system. In a typical application of the present invention, aircraft flying over a floating device specially constructed in accordance with the invention and comprising a relatively stationary air-sea interface acoustical coupler generates a short powerful pulse of selected acoustical energy which is propagated in the water from the coupler. The propagated pulse may then be detected upon its reflection from one or more submarine targets. This pulse may be derived either from the noise of the overflying aircraft r from an airborne sound generator (e.g., siren), but in either case is analogous to the pulse from a conventional sonar projector and the resulting echos may be processed in any one or more essentially conventional ways.

The ability of the present invention to improve the efficiency of the transmission of acoustic energy between air and water makes possible its use in communication between aircraft and submarines.

The novel method of the present invention is based upon the use of novel interface coupler apparatus which will be described hereinafter and which may be embodied in a number of configurations. Typical of these various embodiments are: (1) a simple quarter-wave type impedance transforming unit comprising a plate of relatively resilient material, such as rubber, floating on the surface of the water and which is tuned to one or more prominent frequency components of the aircraft noise (or airborne sound generator); (2) a complex solid or semi-solid acoustical coupler so tuned and floating; (3) tubular sound collectors, including varying cross sections, designed to collect aircraft noise over a relatively large area and conduct it in air to solid couplers below the interface for transduction to either directional or non-directional underwater energy.

Acoustical couplers constructed according to the invention may include sound pickup and radio link apparatus to function in a manner analogous to sonobuoys to transduce, possibly process, and to transmit received echoes resulting from the sonar signal derived from the aircraft noise as discussed above. These novel coupler devices may be designed for free or captive launching by ships, submarines, or aircraft. Various modifications of the basic structure are contemplated to provide retrievable, permanent, semi-permanent, and expendable forms of the invention. Devices constructed in accordance with the invention may be used in a multiple arrangement as a semi-fixed barrier system, in a single arrangement, or in many intermediate arrangements as will appear hereinafter.

The invention resides partly in the physical and acoustical structures and inter-relationships embodied in the airborne sound projector and the floating interface coupler component of the system as herein specifically illustrated, but also embraces the concept of the system itself, considered as an integrated whole, and independently of the structural details of its several parts.

It is, therefore, a principal object of the invention to provide novel and improved methods and apparatus for increasing the efficiency with which acoustical energy may be coupled between air and water.

Another object of the invention is to provide novel and improved methods and apparatus for communicating with submarines.

Still another object of the invention is to provide novel and improved apparatus to detect and locate submerged submarines.

Another object of the invention is to provide novel and improved apparatus utilizing a sound pulse generated by the noise of an airplane passing over and near a floating buoy containing the device.

Still another object of the invention is to provide novel and improved acoustical interface coupling apparatus for transferring airborne sounds into a body of water.

Yet another object of the invention is to provide novel and improved active echo ranging apparatus for the detection of submerged submarines which uses energy from an overflying aircraft as the source of the projected sound pulse.

Still another object of the invention is to provide airborne anti-submarine warfare apparatus which overcomes the short-comings and disadvantages of previously employed means and methods used for accomplishing generally similar purposes.

Still another object of the invention is to provide a simple and relatively inexpensive means for producing and projecting an underwater sound pulse in a sonar system.

Other objects of the invention will in part be obvious and will in part appear hereinafter.

The invention will be understood more completely from the following detailed description, taken in conjunction with the drawings, in which.

Figure 1:
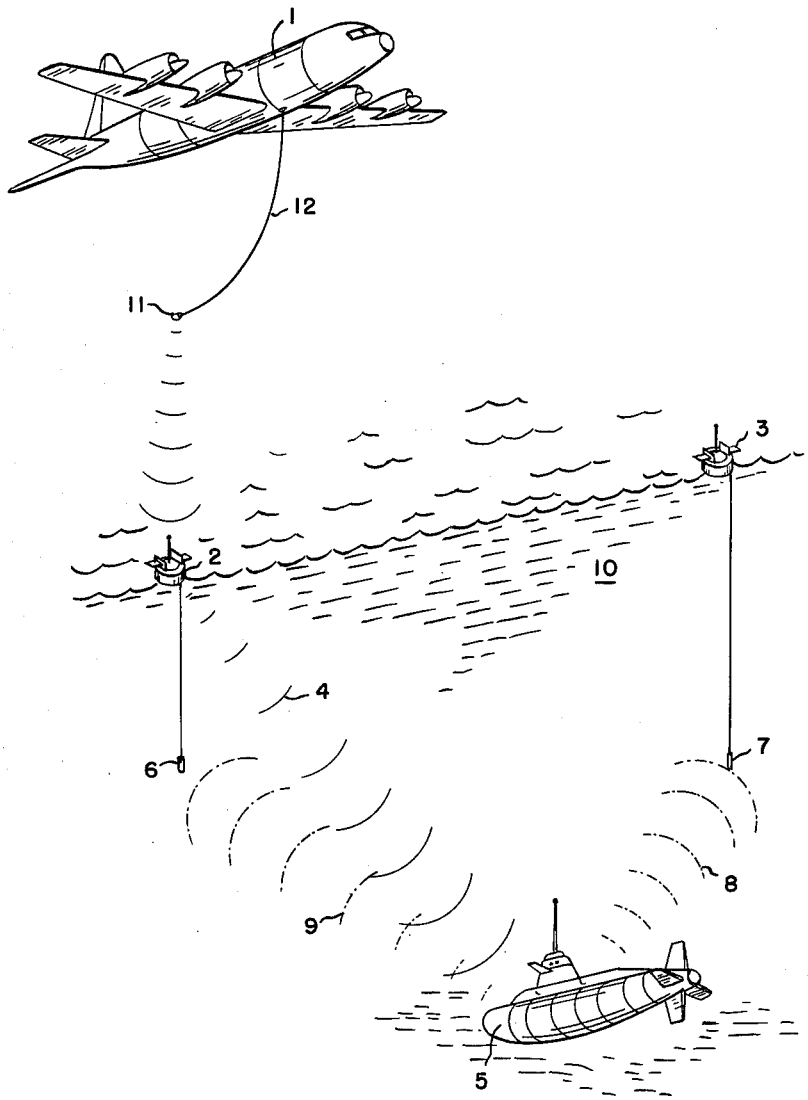
FIGURE 1 is a diagrammatic illustration showing the various elements comprising an overall system which utilizes the method and apparatus of the present invention.

The system of the present invention utilizes an air-water interface accoustical coupling element to augment selective transmissions of aircraft generated sounds from the air into the water. The overall system comprises an aircraft 1 flying over one or more relatively stationary interface acoustical couplers (e.g., couplers 2 and 3). It is preferred that the aircraft be of the propeller type since the propagation of propeller generated sound has favorable directional characteristics for exciting the acoustical coupler. Pure jet aircraft, on the other hand, radiate engine sounds principally in a horizontal plane and thus will not result in the desired excitation of the coupler, as will appear hereinafter. The couplers are jettisoned from the aircraft 1 over the area of interest. The noise of the propeller aircraft 1, passing over and near the floating couplers causes them to be insonified for a short period. For brevity and convenience, throughout the following description the term "coupler" is used to indicate the interface acoustical coupler and its appurtenances. A pulse effect results from the movement of the aircraft 1 over the coupler 2. The resulting pulse of selected acoustical energy is propagated in the water (10) away from the coupler 2, as indicated at 4. The pulse effectively serves as an active sonar signal of the type projected from conventional sonar projectors and is utilized as such in a variety of ways. Reception of echoes from this projected signal may, for example, be sensed at the same coupler (2) by means of apparatus which will be described in detail hereinafter, or from a remote receiver.

Sound pulses reflected from submarine 5 are picked up by hydrophones 6 and 7 suspended beneath the couplers 2 and 3 and transmitted from by radio to the aircraft 1 where they are processed in a manner similar to conventional sonar equipment. The reflected sound pulses are indicated at 8 and 9.

As regards the generation or reception of underwater sounds the word "projector" is generally applied to a sound generator, while "hydrophone" refers to a receiver. A common type of receiving transducer is a line hydrophone which has the shape of a long circular cylinder. Hydrophones 6 and 7 may be of this or any other suitable construction.

If desired, and in order to better control the characteristics of the airborne sound, a sound generator 11, such as a siren, whistle, or the like, may be towed at the end of a cable 12, suspended beneath the aircraft 1. If an auxiliary sound source (e.g., 11) is used, it is preferably designed to be downwardly directional in order to sharpen the resulting pulse as well as to increase the intensity of the usable energy. Such an arrangement will also reduce the in-air spreading loss of sound reaching the coupler. Whether a siren or the ordinary noise of the aircraft is used to insonify the interface acoustical couplers, the energy level of the airborne sound is relatively high. Thus, the problem of providing a sound source of high intensity in compact, jettisonable, "sonobuoy" type of device is solved.

The interface coupler may be embodied in various forms and modifications. In its simplest form, the apparatus may comprise a quarter-wave plate coupler of the type shown generally in FIGURE 2. This apparatus comprises a plate 13 of suitable material which functions as an acoustical transformer to match the acoustical impedance of the water. The plate 13 may comprise a laminated structure having an upper layer 13a, a central layer 13c, and a lower layer 13b. Layer 13a preferably has a thickness equal to one-quarter of the wavelength in rubber of the airborne excitation source and may be fabricated from any suitable material such as rubber. Layer 13c preferably has the same impedance as the water 17, and may, for example, be fabricated from Rho-c rubber. The Rho-c rubber attached to the underside of the quarter-wave layers 13a will serve to provide the desired stiffening of the upper layer 13a without interfering with the basic acoustical transmission properties of the device. Layer 13b is preferably an open grid of buoyant material such as cork, for example, to provide for flotation.

The characteristic impedance of water is approximately 3600 times that of air, which means that small displacements and large pressure are involed in sound waves under the water. The impedance match provided by the coupler results in the maximum transfer of sound energy from the air to the water. It is preferred that plate 13 have a slightly convex upper surface 14 to aid shedding of water and which generally protrudes into the air 16. It has a plane or slightly concave lower surface 15. This arrangement also will aid in controlling dispersal of the sound propagated in the water 17. Classical acoustical theory, describing the characteristics of sound transmission through three contiguous media, may be applied in the practical design of such devices. Such theory is well known to those skilled in the art and predicts the possibility of near perfect coupling of selected sound power from air to water and conversely. It is shown that the power transmission becomes unity for a certain family of frequencies, which depend on coupler thickness, when the acoustic impedance of the coupling medium is the geometric mean of the acoustic impedances of the other two media. Since rubber approximates such a coupling medium when the other two media are air and water, the use of rubber as an exemplary material is given. For a simple coupler of the type shown in FIGURE 2, before spreading becomes significant, this near unity transfer of sound power applies also to sound intensity, since sound intensity is power per unit area normal to the propagation direction. For equal acoustic intensities in air and water the acoustic pressure in water is approximately 60 times (36 decibels) greater than the corresponding pressure in air.

Figure 2:
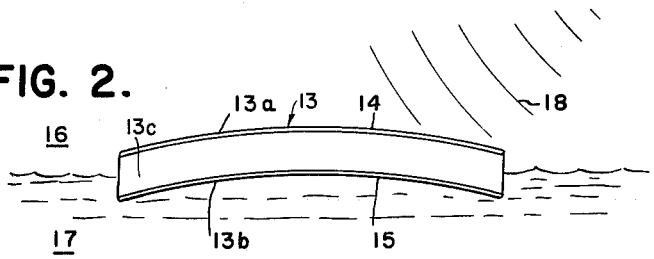
FIGURE 2 is a diagrammatic illustration of a first embodiment of an acoustic interface coupler as used in the system of the invention.

The device of FIGURE 2 may be readily transported by aircraft, floated-freely where desired and following use may be retrieved by the aircraft for return to base. Since this embodiment of the coupler does not include echo pickup apparatus, it is intended that it be used in conjunction with conventional sonobuoys which, in this instance, respond to echoes rather than sounds originating from the target.

Figure 3:
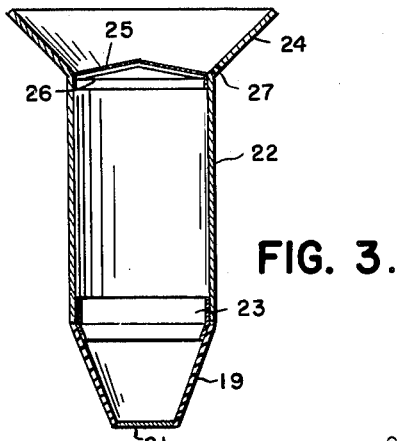
FIGURE 3 is an alternative embodiment of an interface acoustic coupler, incorporating a tubular sound collector.

Looking now at FIGURE 3 there is shown a second embodiment of the coupler portion of system which is somewhat more complex than the embodiment of FIGURE 2 but which exhibits improved sound transfer efficiency and utilization of the airborne sound. In this embodiment the acoustical coupler element is formed in the shape of an inverted hollow frustum 19. The lower end of the frustum is sealed off by a disc 21 which may be fabricated from metal or other suitable material. The upper end of the frustum 19 is joined to a hollow cylindrical tube 22 of appropriate diameter and which may be fabricated from metal or other suitable material. The structural rigidity of the device may be enhanced by means of an interior ring member 23 which is located at the juncture between the frustum 19 and the tube 22. The upper end of the tube 22 is provided with a flared horn 24 which serves as a sound collector to funnel the airborne sound downwardly through tube 22 to frustum 19 and comprising the acoustical coupler element. The frustum 19 is fabricated from rubber, plastic, or other material having the desired acoustical properties. This material is sufficiently flexible that sound waves impinging on the interior surface will be transmitted outwardly into the water from the exterior surface. The overall structure is designed to float in the water and by reason of the air contained within the device it will be buoyant. Since the center of gravity is in the lower half of the device, as viewed in FIGURE 3, it will float upright in the water regardless of the attitude at which it strikes the water when jettisoned from an aircraft.

To prevent water from splashing into or otherwise filling the hollow tubular portion, the device may be provided with a thin membrane 25 which is substantially sound transparent but which is impervious to water. This membrane 25 may be supported on a screen 26 or other rigid sound transparent material which may be readily formed to have an upwardly extending convex shape. This convex shape will cause any water which may inadvertently splash into the upwardly extending horn 24 to drain out through hole 27 which is provided on the upper side of the juncture between the horn 24 and the tube 22.

The embodiment of FIGURE 3 is like that of FIGURE 2 in that it comprises only an element in the projector portion of an active sonar system and requires that additional pickup devices, such as conventional sonobuoys be used in conjunction therewith.

Figure 4:
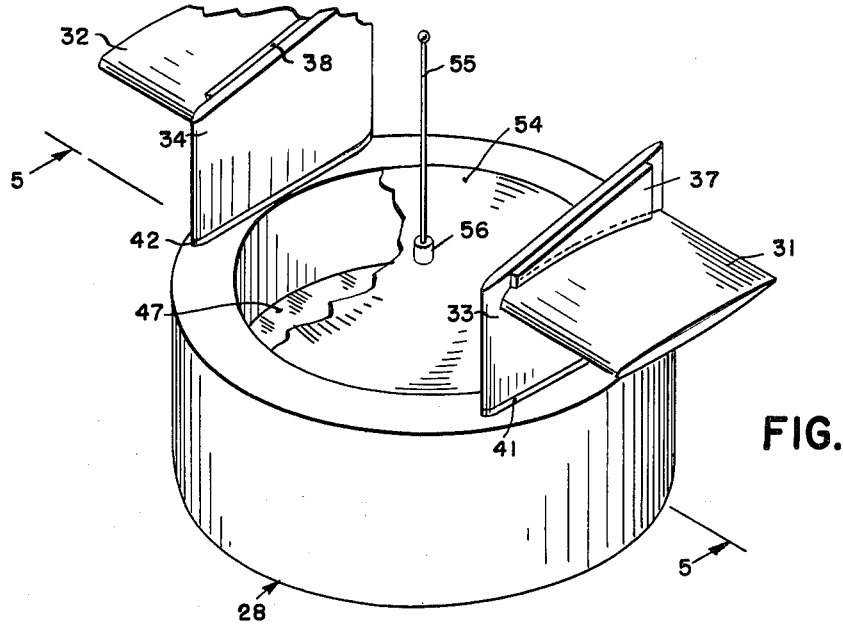
FIGURE 4 is a third embodiment of an interface acoustic coupler employing a complex solid or semi-solid tuned element in a floating buoy, together with related apparatus.

Looking now at FIGURE 4 there is shown another embodiment of the invention which incorporates self-contained sound pickup and radio link elements. This embodiment comprises a buoy 28, which, for example, may have a generally cylindrical ring shape. The ring shape illustrated is not a necessary limitation, since other configurations, such as a boat shape, may be employed as desired. To facilitate its being launched from aircraft this embodiment is provided with a pair of retractable vanes or aerodynamic glide surfaces 31 and 32 which slow its descent to the surface of the water. Also, glide surfaces 31 and 32 aid in controlling the direction of the apparatus as it glides downwardly, to insure that it will land upright in the water. The glide surfaces 31 and 32 are supported from retractable stabilizers 33 and 34, respectively, hinged thereto by means of hinges 35 and 36 (see FIGURE 5). Hinges 35 and 36 will permit surfaces 31 and 32 to be folded downwardly during storage and will permit them to move upwardly and lock against stop members 37 and 38, respectively, while in flight. Stabilizers 33 and 34 are hinged to members 41 and 42 whereby they may be folded downwardly as indicated by arrow 39 in the stored condition. Members 41 and 42 are fixedly attached to buoy 28.

Figure 5:
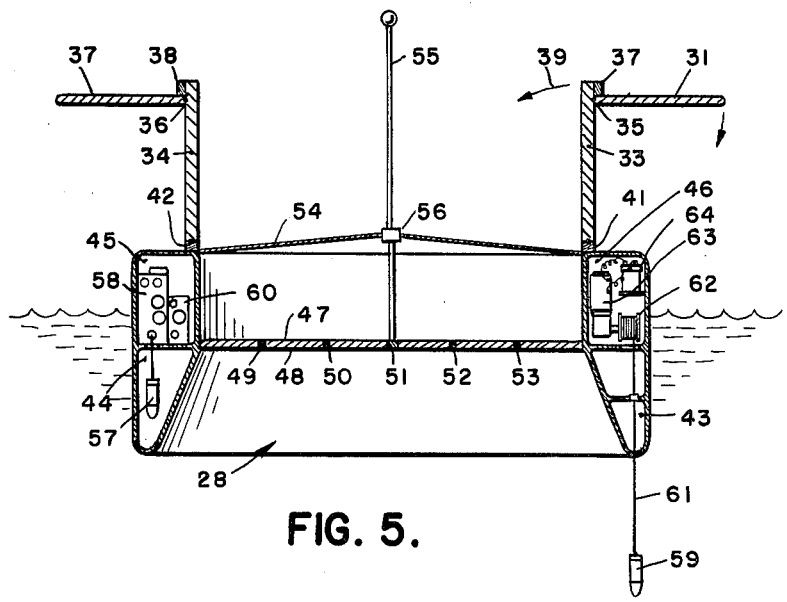
FIGURE 5 is a sectional view of the apparatus of FIGURE 4 taken along line 5—5.

As can be seen in FIGURE 5, the ring shaped buoy 28 is hollow and is provided with a plurality of interior compartments 43–46 for housing certain electrical apparatus as will be described in detail hereinafter. The acoustical coupler element in this embodiment may be, for example, in the form of a disc supported within the interior opening of the ring shaped buoy 28. This disc coupler comprises a series of elements, each including two diaphragms 47 and 48. These coupler elements are separated by a plurality of appropriately disposed spacers (e.g., 49–53). In this instance, the coupler comprises a sandwich type of construction having the desired acoustical properties to permit it to act as an impedance transformer between the air exposed to its upper surface (47) and the water exposed to its lower surface (48).

As in the embodiment of FIGURE 3 the device of FIGURES 4 and 5 may be provided with a thin, substantially sound transparent membrane 54 which will prevent water from splashing onto the upper diaphragm surface (47) of the coupler. The membrane 54 may be centrally supported by a vertical radio antenna 55. The function of the antenna 55 will be described hereinafter. A strain relieving collar or grommet 56 is provided at the center of membrane 54 at the point of its attachment to the antenna 55.

The aerodynamic stabilizers 33–34 and the aerodynamic gliding surfaces 31–32 are shown in their extended positions in FIGURES 4 and 5; it should be understood that they are retracted or placed in their folded position during storage.

Compartments 43–46 are used to house the sound pickup and radio link apparatus. Hydrophone 57 is connected to radio transmitter 58, of any suitable and well-known construction which in turn is connected to antenna 55 for transmission of signals to the aircraft. A second hydrophone 59 may be lowered to a desired depth on cable 61 by unwinding reel 62 under the control of reel motor 63. A suitable power source 64 and control apparatus 60 will energize the reel motor 63 to unwind cable 61 in response to contact with the water or by suitable radio control means. Hydrophone 59 is also connected to transmitter 58 for telemetering echoes received from submerged targets to receivers in the overflying aircraft.

In use, the over-flying aircraft radiates airborne sounds which impinge on diaphragm 47 and are transduced via the coupler into water-propagated sounds for re-radiation from diaphragm 49. The excitation or insonification of the coupler is sensed by hydrophone 57 and may be used in a well-known manner to provide range timing signals. Any echoes from the pulse of waterborne sound propagated from diaphragm 49 are sensed by hydrophones 57 and 59 and radioed to the aircraft. Two or more of the devices as shown in FIGURES 4 and 5 may be used to determine the relative location of the target by well-known techniques. This system arrangement is shown in FIGURE 1. A practical construction of a system of this type having nominal characteristics will have an active detection range on the order of four miles.

Figure 6:
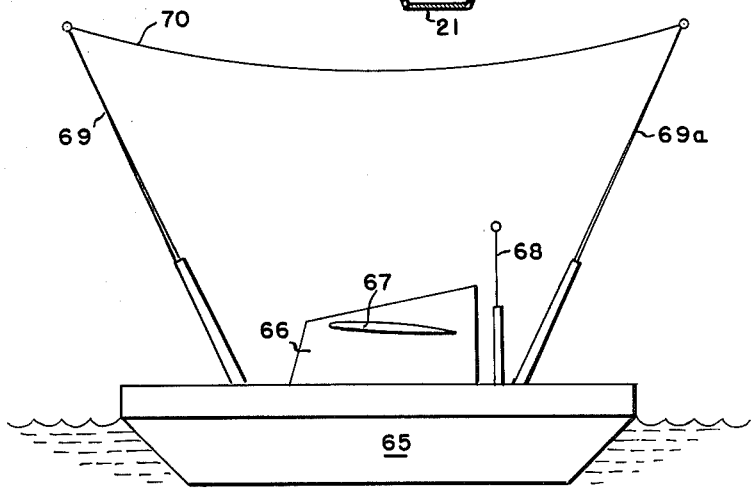
FIGURE 6 is a modification of the apparatus of FIGURES 1, 4 and 5 showing retrieval bail apparatus.

There is shown in FIGURE 6 another modification of the coupler apparatus which permits retrieval of the device by the patrol aircraft once it has served its purpose. With particular reference to FIGURE 6 there is shown a buoy 65 containing an interface coupler (not shown) which is mounted in a manner similar to that of elements 47–49 of FIGURE 5. The buoy 65 is provided with aerodynamic stabilizing means 66 and aerodynamic glide surface means 67 which are functionally analogous to the corresponding elements of the apparatus of FIGURES 4 and 5. In this embodiment, the radio antenna 68 is shown displaced from the central axis of the buoy. The buoy 65 is provided with a pair of upwardly extending arms 69 and 69a, which may be telescoped if desired. Arms 69 and 69a are preferably fabricated from a strong, flexible material such as spring steel. Cable 70 is connected between the upwardly extending ends of arms 69 and 69a and serves as a bail which may be snagged by a trailing hook carried by the over-flying aircraft to permit it to be retrieved and hoisted into the aircraft.

As a general indication of the relative size of the apparatus of FIGURE 6, buoy 65 may have a dimension of approximately sixteen feet along its major axis and may have a thickness of approximately three feet. These dimensions should be considered as exemplary and not as limiting.

Figure 7:
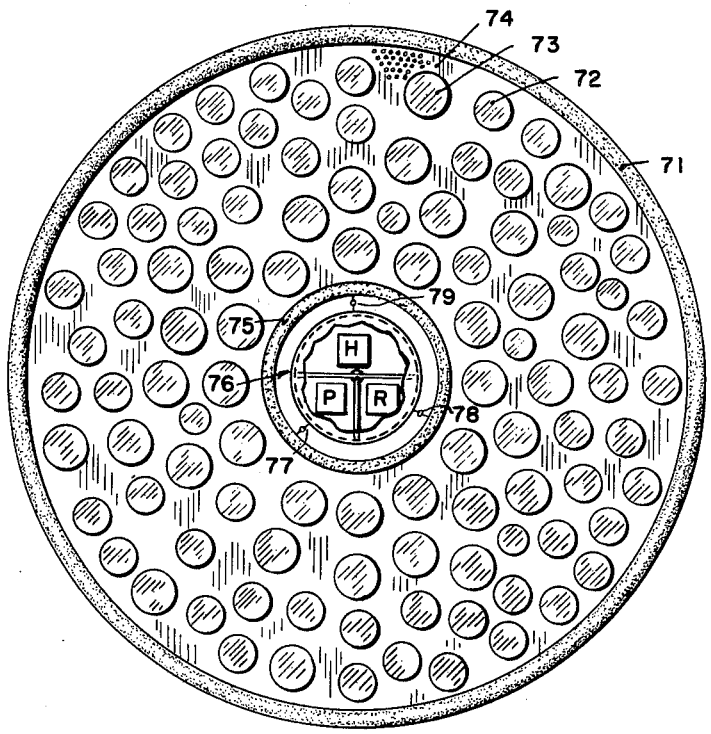
FIGURE 7 is a fourth embodiment of an interface accoustic coupler employing a plurality of flexibility interconnected coupler elements.

Looking now at FIGURE 7 there is shown an acoustic coupler comprising a flexible buoyant frame 71, which may be fabricated from rubber, plastic, or similar material, surrounding a plurality of flexibly interconnected interface acoustical coupler elements (e.g., 72, 73) of the general type shown in FIGURE 2. The several coupler elements (72, 73 etc.) are preferably flexibly interconnected by means of a perforated flexible sheet 74. Sheet 74, in addition to interconnecting the separate elements, also serves as a wavelet squelcher to suppress the effects of surface wavelets on the water from interfering with the operation of the device.

The center of the coupler assembly is provided with circular frame 75 to which sheet 74 is attached. Frame 75 may be made from the same material as frame 71. A housing 76 of suitable shape is supported within frame 75 by any convenient fastening means such as links 77–79, and is used to house the sound pickup and radio transmitting apparatus, as well as a hydrophone, reel and control apparatus of the nature described in FIGURE 5. Housing 76 may readily be detached from the blanket of coupler elements by removing links 77–79.

In a typical construction, the overall diameter of the device of FIGURE 7 may be of the order of 12 feet. Assuming there is an exciting source velocity (viz. aircraft speed) of 400 knots, a 12 foot diameter will provide a "sonar ping" length of approximately 20 milliseconds. As can be seen, this embodiment basically comprises a multiple coupler assembly, wherein each element has the desired piston-like motion which would be difficult to obtain in a single very large coupler disc.

It is to be understood that inasmuch as the sound pickup and radio link portions of the system do not constitute part of the instant invention, only so much of the structural details and operational features thereof considered to be essential for a complete understanding of the invention have been described herein. These elements are well known to those versed in the art and it is deemed that the preceding disclosure is sufficient to permit the invention to be practiced by those so versed. Since certain changes may be made in the above method, devices and apparatus without departing from the scope of the invention herein involved, it is intended that all matter contained in the above description and as shown in the accompanying drawings shall be interpreted as illustrative and not in a limiting sense. For example, the radio link may comprise a plurality of radio channels whereby the patrol aircraft can launch a number of the devices of the invention in a pattern about the suspected position of the submarine. Also, it is contemplated that the interface coupler apparatus may be used effectively for broad-band passive listening since its platform noise is inherently low.

As will be apparent to those versed in the art, sound pulses propagated into the water by means of the apparatus of the invention may be used as communication signals between aircraft and underwater craft or submerged stations. Since the various above-described embodiments of the invention will transmit sound for a family of harmonically related frequencies, the apparatus of the invention may be used to communicate by means of complex coding of frequency and/or intensity of the sound pulses.

Also, it should be understood that means other than an overflying aircraft may be employed as the source of the acoustical excitation. For example, an in-air explosive or solid impact may be used. Other applications of the apparatus will be apparent to those versed in the art. It being understood that various omissions and substitutions and changes in the forms and details of the devices illustrated and in their operation may be made by those skilled in the art, without departing from the spirit of the invention, it is then intended that the invention be limited only as indicated by the scope of the following claims.

What is claimed is:

I claim:

1. The method of detecting an underwater target by sound echoes comprising the steps of:
   (a) launching interface acoustical coupler means onto the surface of the water over the area of interest;

(b) introducing sound pickup means into the water in said area of interest;
(c) rapidly traversing said coupler means with a source of airborne sound and thereby propagating a pulse of sound energy into the water; and
(d) detecting the presence of echoes reflected from said target arriving at said pickup means.

2. The method defined in claim 1 including the steps of:
  (a) measuring the time interval between said traversing step and said detection step in order to determine the range of said target from said pickup means.

3. The method as defined in claim 1 including the steps of:
  (a) introducing a second sound pickup means into the water at a point displaced from the location of said first sound pickup means; and
  (b) the step of comparing the times of arrival of said echoes in order to determine the location of said target.

4. Apparatus for transmitting sound from an airborne source to a submerged location comprising:
  (a) a source of airborne sound;
  (b) acoustical interface coupling means placed on the surface of the water for providing an acoustical impedance match between air and water; and
  (c) means for rapidly moving said sound source through the air over said coupling means and the moving means includes an aircraft and the sound source comprises a sound generator towed beneath said aircraft thereby propagating a pulse of sound into the water.

5. Apparatus as defined in claim 4 wherein said coupling means comprises:
  (a) a spacer, and a pair of diaphragms disposed on opposite sides of the spacer.

6. Apparatus as defined in claim 4 wherein said coupling means comprises:
  (a) a tubular sound collector having an open, upwardly extending, sound receiving end; and
  (b) a watertight, downwardly extending, end and having an acoustical impedance transforming wall located in said downwardly extending end.

7. Apparatus as defined in claim 4, wherein said coupling means comprises:
  (a) a bouyant plate.

8. Apparatus as defined in claim 7 wherein said plate is tuned to one or more prominent frequency components of said airborne sound.

9. Apparatus as defined in claim 4 wherein said coupling comprises:
  (a) a plurality of discs; and
  (b) flexible means interconnecting said discs in substantially a common plane.

10. Submarine detection apparatus comprising:
  (a) a buoy;
  (b) aerodynamic glide surface means mounted on said buoy whereby said buoy may be launched from an aircraft and will follow a stable flight path until it contacts the surface of the water; and
  (c) acoustical interface coupling means supported by said buoy for providing an acoustical impedance match between the air and said water.

11. Submarine detection apparatus as defined in claim 10, including sound pickup means responsive to waterborne sound in the vicinity of said buoy.

12. Submarine detection apparatus as defined in claim 10 wherein said glide surface means are provided with hinge means whereby said surface means may be extended into a first position for flight and may be retracted to a second position for storage.

13. Submarine detection apparatus as defined in claim 10 including a sound transparent, waterproof, protective membrane covering said coupling means preventing water from coming into contact with said coupling means.

14. Submarine detection apparatus as defined in claim 10 including:
  (a) retrieving bail means extending upwardly from said buoy to facilitate retrieval of said buoy by an over-flying aircraft.

References Cited by the Examiner
UNITED STATES PATENTS

| 2,164,858 | 7/1939  | West    | 340—12 |
| 2,430,013 | 11/1947 | Hansell | 340—10 |
| 2,832,572 | 4/1958  | Meng    | 259—1  |

LEWIS H. MYERS, *Primary Examiner.*
CHESTER L. JUSTUS, *Examiner.*